United States Patent
Piazza et al.

(10) Patent No.: US 11,500,465 B1
(45) Date of Patent: Nov. 15, 2022

(54) SYSTEMS INCLUDING VIBROTACTILE ACTUATORS AND INFLATABLE BLADDERS, AND RELATED METHODS

(71) Applicant: META PLATFORMS TECHNOLOGIES, LLC, Menlo Park, CA (US)

(72) Inventors: Daniele Piazza, Redmond, WA (US); Tristan Thomas Trutna, Portland, OR (US); Charles Stewart, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/228,945

(22) Filed: Apr. 13, 2021

Related U.S. Application Data

(63) Continuation of application No. 16/788,594, filed on Feb. 12, 2020, now Pat. No. 11,009,959.

(60) Provisional application No. 62/845,853, filed on May 9, 2019.

(51) Int. Cl.
| | | |
|---|---|---|
| *G08B 21/12* | (2006.01) | |
| *G06F 3/01* | (2006.01) | |
| *G06F 1/16* | (2006.01) | |
| *G08B 6/00* | (2006.01) | |
| *G02B 27/01* | (2006.01) | |

(52) U.S. Cl.
CPC ......... *G06F 3/016* (2013.01); *G02B 27/0172* (2013.01); *G06F 1/163* (2013.01); *G08B 6/00* (2013.01)

(58) Field of Classification Search
USPC ........ 340/540, 407.1, 407.2, 4.12, 7.2, 7.58, 340/686.1, 539.1
See application file for complete search history.

(56) References Cited

U.S. PATENT DOCUMENTS

| | | | |
|---|---|---|---|
| 6,008,598 A | 12/1999 | Luff et al. | |
| 10,013,062 B1* | 7/2018 | Corson | G06F 3/016 |
| 10,048,703 B1 | 8/2018 | Shaker et al. | |
| 10,353,466 B1 | 7/2019 | Keller et al. | |
| 11,009,959 B1* | 5/2021 | Piazza | G06F 3/016 |
| 2002/0021277 A1* | 2/2002 | Kramer | G06F 3/03543 |
| | | | 345/156 |
| 2002/0163486 A1* | 11/2002 | Ronzani | G02B 27/017 |
| | | | 345/87 |
| 2003/0016207 A1* | 1/2003 | Tremblay | G06F 3/011 |
| | | | 345/156 |
| 2007/0202841 A1 | 8/2007 | Cruz-Hernandez et al. | |

(Continued)

OTHER PUBLICATIONS

Non-Final Office Action received for U.S. Appl. No. 16/788,594 dated Sep. 9, 2020, 36 pages.

(Continued)

*Primary Examiner* — Daniel Previl
(74) *Attorney, Agent, or Firm* — FisherBroyles, LLP

(57) ABSTRACT

The disclosed haptic vibrotactile actuators on inflatable bladders may include an inflatable bladder and a flexible haptic vibrotactile actuator positioned on or in the inflatable bladder such that inflation and deflation of the inflatable bladder alters a vibrotactile sensation induced by the flexible haptic vibrotactile actuator in response to activation of the flexible haptic vibrotactile actuator. Various other related methods and systems are also disclosed.

20 Claims, 15 Drawing Sheets

(56) References Cited

U.S. PATENT DOCUMENTS

| | | | |
|---|---|---|---|
| 2008/0092295 A1* | 4/2008 | Flick | A61G 7/05776 5/600 |
| 2008/0235875 A1 | 10/2008 | Wells | |
| 2009/0106898 A1 | 4/2009 | Flick et al. | |
| 2011/0301432 A1 | 12/2011 | Riley et al. | |
| 2013/0018281 A1* | 1/2013 | Nagale | A61B 5/208 600/587 |
| 2013/0145558 A1* | 6/2013 | Bhai | A61B 5/1113 5/710 |
| 2014/0053371 A1* | 2/2014 | Feinstein | B25D 17/043 16/430 |
| 2014/0270663 A1* | 9/2014 | Johnson | G02B 6/4429 385/100 |
| 2016/0019762 A1 | 1/2016 | Levesque et al. | |
| 2019/0110950 A1* | 4/2019 | Smith | G06F 3/0346 |
| 2019/0113971 A1* | 4/2019 | Ahne | G06F 3/014 |
| 2019/0193754 A1 | 6/2019 | Augst | |
| 2020/0019245 A1 | 1/2020 | Ganadas et al. | |

OTHER PUBLICATIONS

Notice of Allowance received for U.S. Appl. No. 16/788,594 dated Feb. 3, 2021, 29 pages.

* cited by examiner

SYSTEMS INCLUDING VIBROTACTILE ACTUATORS AND INFLATABLE BLADDERS, AND RELATED METHODS

CROSS REFERENCE TO RELATED APPLICATIONS

This application is a continuation of U.S. Non-Provisional patent application Ser. No. 16/788,594, filed Feb. 12, 2020, which claims the benefit of U.S. Provisional Application No. 62/845,853, filed on May 9, 2019, the disclosure of each of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
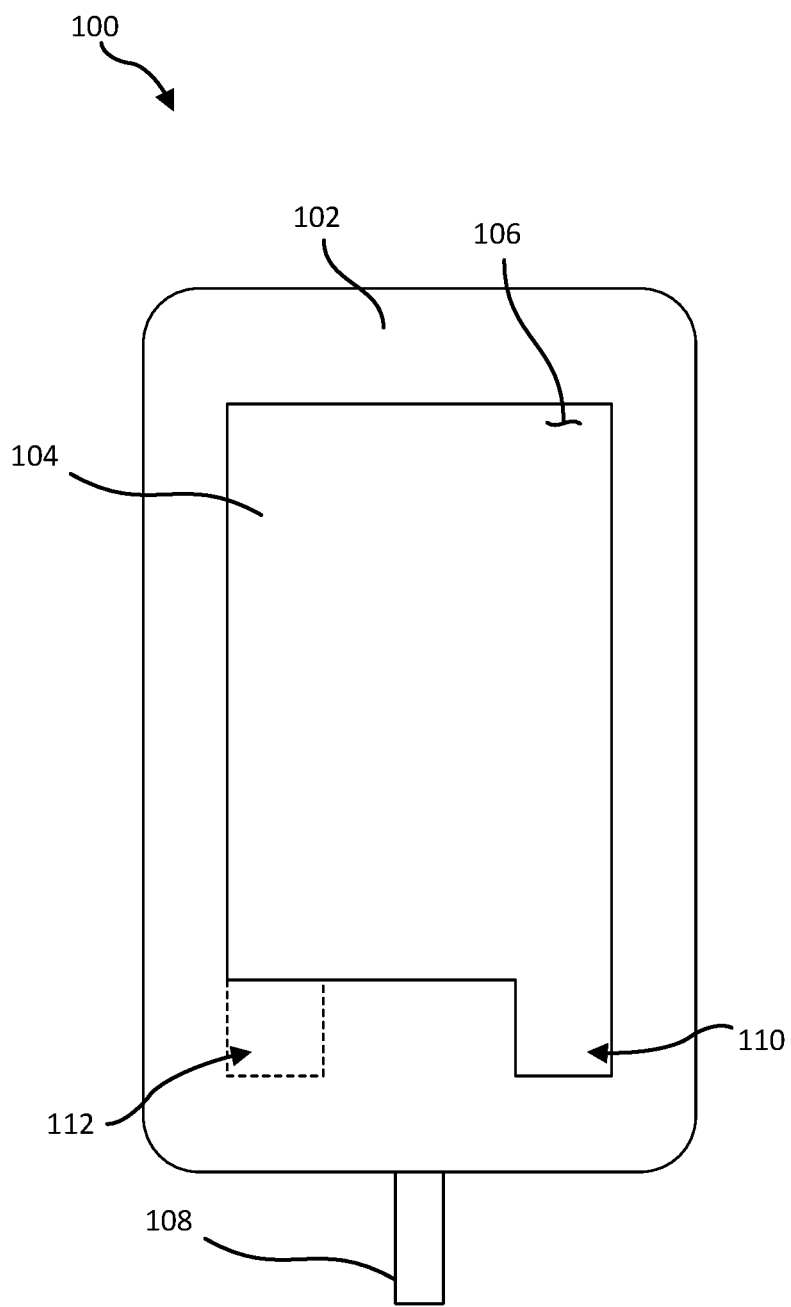
FIG. 1 is a plan view of a flexible haptic vibrotactile actuator on or in an inflatable bladder according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Vibrotactile devices include devices that may vibrate to provide haptic feedback to a user of a device. For example, some modern mobile devices (e.g., cell phones, tablets, mobile gaming devices, gaming controllers, etc.) include a vibrotactile device that informs the user through a vibration that an action has been taken. The vibration may indicate to the user that a selection has been made or a touch event has been sensed. Vibrotactile devices may also be used to provide an alert or signal to the user.

Various types of vibrotactile devices exist, such as piezoelectric devices, eccentric rotating mass devices, and linear resonant actuators. Such conventional vibrotactile devices may include one or more elements that vibrate upon application of an electrical voltage. In the case of piezoelectric devices, an applied voltage may induce bending or other displacement in a piezoelectric material. Eccentric rotating mass devices induce vibration by rotating an off-center mass around an axle of an electromagnetic motor. Linear resonant actuators may include a mass on an end of a spring that is driven by a linear actuator to cause vibration. Many of these conventional vibrotactile devices are rigid and inflexible. Moreover, conventional vibrotactile devices typically induce a certain, constant sensation to the user upon application of a consistent voltage thereto.

According to some embodiments, the present disclosure is generally directed to a haptic vibrotactile actuator system, which may include a flexible haptic vibrotactile actuator positioned on or in an inflatable bladder. The flexible haptic vibrotactile actuator may include an electroactive material that is configured to vibrate upon application of a sufficient electrical voltage thereto. For example, inflation and deflation of the inflatable bladder may alter a vibrotactile sensation induced by the flexible haptic vibrotactile actuator when activated, such as by altering a stiffness of the flexible haptic vibrotactile actuator. Additionally or alternatively, three modes of haptic feedback may be provided to a user donning a wearable article including the haptic vibrotactile actuator system in a single location, namely a pressure sensation upon inflation of the inflatable bladder, a vibrotactile sensation upon activation of the flexible haptic vibrotactile actuator, and a combined pressure sensation and vibrotactile sensation.

Figure 8:
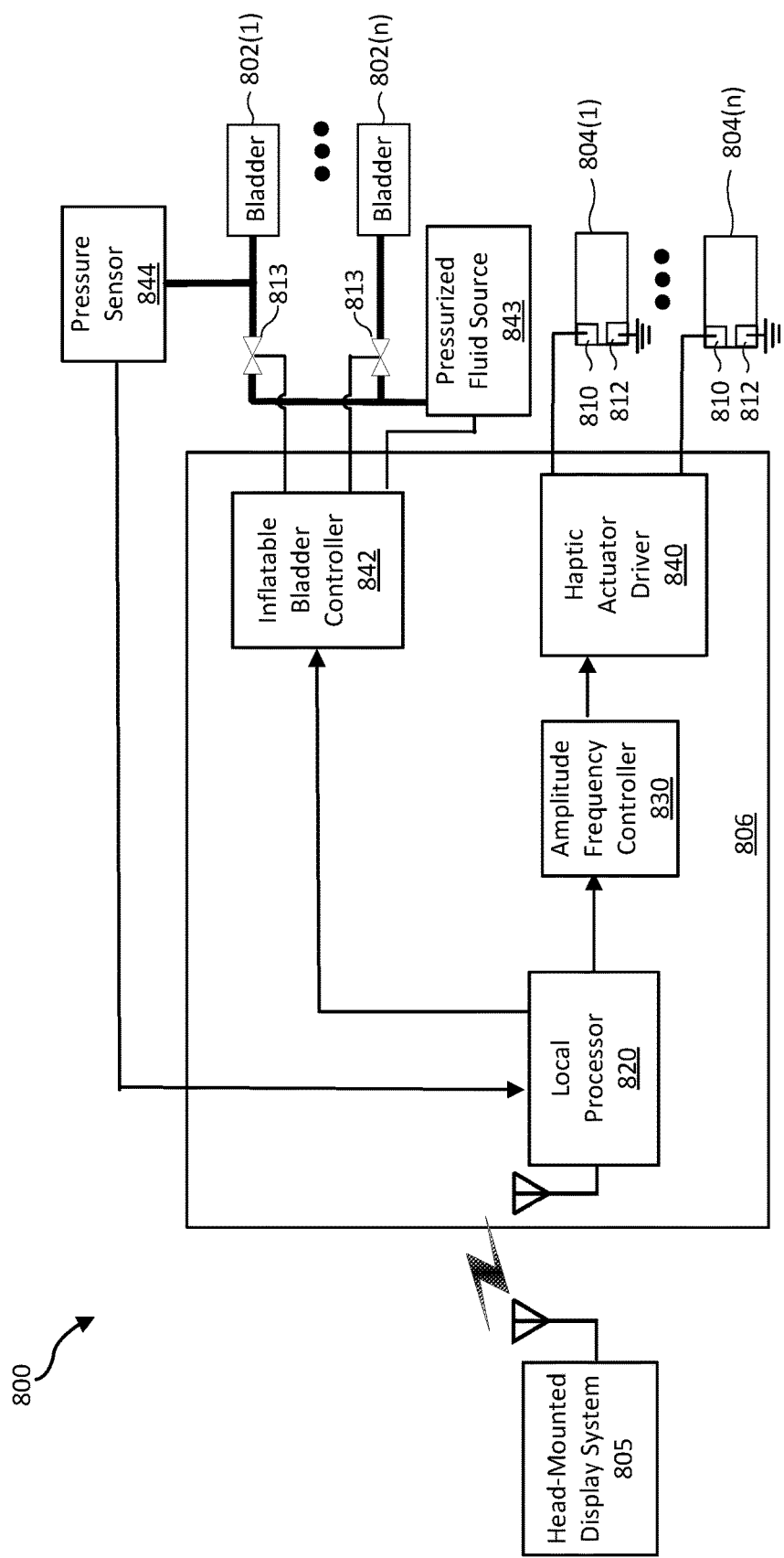
FIG. 8 is a block diagram of an artificial-reality system including flexible haptic vibrotactile actuators on or in inflatable bladders, according to at least one embodiment of the present disclosure.
Figure 9:
FIG. 9 is a flow diagram illustrating a method of inducing vibrotactile and pressure sensations to a user according to at least one embodiment of the present disclosure.

The following will provide, with reference to FIGS. 1-15, detailed descriptions of flexible haptic vibrotactile actuators on inflatable bladders and related systems and methods. First, a description of various flexible haptic vibrotactile actuators on or in inflatable bladders and their characteristics is presented in reference to FIGS. 1-3. With reference to FIGS. 4-7, the following will describe the integration of flexible haptic vibrotactile actuators and inflatable bladders into wearable articles. FIG. 8 illustrates an artificial-reality system that includes flexible haptic vibrotactile actuators on or in inflatable bladders and a haptic controller. FIG. 9 illustrates a method of inducing vibrotactile and pressure sensations to a user. FIGS. 10-15 illustrate various types of example artificial-reality devices that may be used with a wearable article including flexible haptic vibrotactile actuators and inflatable bladders.

FIG. 1 illustrates a haptic vibrotactile actuator system 100 (also referred to as "system 100" for simplicity) that may include an inflatable bladder 102 and a flexible haptic vibrotactile actuator 104 positioned on or in inflatable bladder 102 such that inflation and deflation of inflatable bladder 102 may alter a characteristic of a vibrotactile sensation (e.g., a vibration sensation) induced by flexible haptic vibrotactile actuator 104 when activated. For example, flexible haptic vibrotactile actuator 104 may include a flexible electroactive material 106 positioned on or in inflatable bladder 102.

Flexible electroactive material 106 may be any suitable material that may withstand bending and deformation due to external forces (e.g., forces associated with use in a wearable article, such as a glove) without permanent damage and that is configured to deform in response to application of a sufficient voltage. By way of example and not limitation, flexible electroactive material 106 may include one or more of the following: an electroactive polymer material, a dielectric elastomer material, a relaxor ferroelectric material, a piezoelectric ceramic material, a piezoelectric polycrystalline material and/or a piezoelectric single-crystal material. Flexible electroactive material 106 may have a thickness of about 150 μm or less, such as to improve a flexibility thereof (e.g., compared to thicker electroactive materials).

Inflatable bladder 102 may include at least one fluid port 108 positioned and configured to inflate and/or deflate inflatable bladder 102. For example, fluid port 108 may be configured to inflate inflatable bladder 102 upon receipt of a pressurized fluid from a pressurized fluid source. The pressurized fluid source may include, without limitation, a fan, a piston, a valve, a pump, a pressurized chamber, a compressor, or another fluidic device. The pressurized fluid may be a gas (e.g., air, nitrogen, vapor, etc.) or a liquid (e.g., water, etc.). As will be described below with respect to FIGS. 4-8, a haptic system may include multiple inflatable bladders 102 in which each of inflatable bladders 102 receive a pressurized fluid from a pressurized fluid source. In some examples, each of inflatable bladders 102 may receive the same pressure level of pressurized fluid or certain inflatable bladders 102 may receive a different pressure level of pressurized fluid. Each of inflatable bladders 102 may include at least one fluid port 108 connected to a valve that controls a flow of pressurized fluid from the pressurized fluid source to inflatable bladders 102. Further, each of inflatable bladders 102 may be coupled to a pressure sensor that measures the pressure level of the pressurized fluid. A haptic controller, as described below with respect to FIG. 8, may be configured to control a programmable pressure in inflatable bladders 102 by controlling the flow of pressurized fluid to fluid port 108 and measuring the pressure level of the pressurized fluid.

System 100 may also include a first electrode pad 110 that is electrically connected to a first side of flexible electroactive material 106 and a second electrode pad 112 that is electrically connected to a second, opposite side of flexible electroactive material 106, for applying a voltage to flexible electroactive material 106 to induce deformation (e.g., bending and/or vibrations) in flexible electroactive material 106. By way of example and not limitation, first electrode pad 110 may include or may be coupled to a portion of flexible electroactive material 106, such as a protrusion extending from a portion of the flexible electroactive material 106 as illustrated in FIG. 1. In some examples, a conductive electrode material may be positioned over first flexible electroactive material 106 for applying an actuating voltage to the surface of flexible electroactive material 106. Similarly, a second conductive electrode material may be positioned on or adjacent to the opposing side of flexible electroactive material 106 to apply the actuating voltage between the first and second conductive electrode materials. The actuating voltage may create an electric field across flexible electroactive material 106. Flexible haptic vibrotactile actuator 104 may exhibit a change in size or shape (e.g., a deflection or displacement) when stimulated by the electric field. By applying an alternating polarity voltage (e.g., as described below with respect to FIG. 8) to first electrode pad 110 and second electrode pad 112, flexible haptic vibrotactile actuator 104 may vibrate out of plane (e.g., in-and-out of the page from the perspective of FIG. 1).

Inflatable bladder 102 may be configured to, upon inflation, apply a pressure to an intended user (e.g., to a finger or hand of the intended user) donning a wearable article incorporating system 100, such as described below with respect to FIGS. 4-8. Alternatively or additionally, inflatable bladder 102 may be configured to provide a variable-stiffness substrate to flexible haptic vibrotactile actuator 104. For example, inflation of inflatable bladder 102 may result in a stiffer substrate for flexible haptic vibrotactile actuator 104 compared to deflation of inflatable bladder 102. The stiffness of the substrate may alter an operating characteristic of flexible haptic vibrotactile actuator 104 based on the level of inflation or deflation, even if the actuating voltage applied to flexible haptic vibrotactile actuator 104 remains consistent. By way of example and not limitation, the user may sense a stronger vibration when inflatable bladder 102 is inflated compared to when inflatable bladder 102 is deflated.

In some embodiments, flexible haptic vibrotactile actuator 104 may optionally include a first flexible electroactive material and a second electroactive material. For example, flexible haptic vibrotactile actuator 104 may include a single electroactive material in a so-called "unimorph" configuration, or may optionally include the first electroactive material and the second flexible electroactive material in a so-called "bimorph" configuration. In embodiments in which flexible haptic vibrotactile actuator 104 is configured as a bimorph, an electrically conductive (e.g., ground, electrode, etc.) material and/or an electrically insulating material may be positioned between the first and second flexible electroactive materials. In further embodiments, flexible electroactive actuator 104 may include more than two electroactive materials in a so-called "multi-morph" configuration. In some examples, by arranging multiple (e.g., two or more) layers of flexible electroactive material in parallel (e.g., stacking layers), the resulting actuation force may be multiplied (compared to a comparable unimorph configuration) and the stiffness of flexible haptic vibrotactile actuator 104 may be increased.

Although FIG. 1 illustrates flexible haptic vibrotactile actuator 104 having a substantially rectangular shape, the present disclosure is not so limited. For example, flexible haptic vibrotactile actuators of the present disclosure may have a substantially spiral shape as described with respect to FIG. 3 (such as elliptical spiral, double spiral (e.g., spiraling in toward the center and out toward the edge), helical spiral, triangular spiral, hexagonal spiral, heptagonal spiral, octagonal spiral, logarithmic spiral, parabolic spiral, or hyperbolic spiral, etc.), a circular shape, an elongated shape, an irregular shape, an elliptical shape, a triangular shape, etc. The shape of flexible haptic vibrotactile actuator 104 may be selected in consideration of, for example, an intended use and/or intended location on a wearable article.

Figure 2:
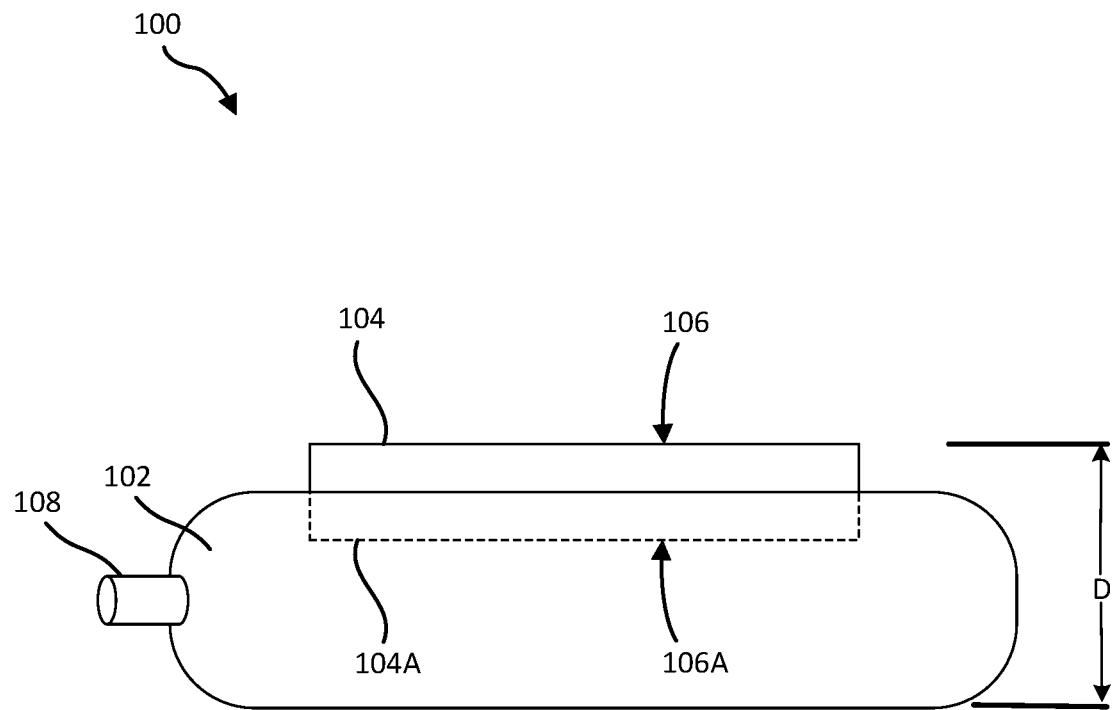
FIG. 2 is a side view of a flexible haptic vibrotactile actuator on or in the inflatable bladder of FIG. 1, according to at least one embodiment of the present disclosure.

FIG. 2 illustrates a side view of haptic vibrotactile system 100 according to at least one embodiment of the present disclosure. As explained above, flexible haptic vibrotactile actuator 104 may be positioned on or in inflatable bladder 102. Flexible haptic vibrotactile actuator 104 is illustrated in FIG. 2 in solid lines in a position on an exterior surface of inflatable bladder 102. An alternative position of flexible haptic vibrotactile actuator 104A is illustrated in FIG. 2 in dashed lines within inflatable bladder 102. In some embodiments, such as when flexible haptic vibrotactile actuator 104, 104A has a bimorph configuration, one flexible electroactive material 106 may be positioned on an exterior surface of inflatable bladder 102 and another flexible electroactive material 106A may be positioned within inflatable bladder 102. Flexible haptic vibrotactile actuator 104 may be directly attached and secured on or in inflatable bladder 102 using a method such as, without limitation, stenciling, screen printing, inkjet technology, 3D printing, lamination, adhesion, or a combination thereof.

Additionally or alternatively, flexible haptic vibrotactile actuator 104 may be integrated into a membrane of inflatable bladder 102. For example, flexible haptic vibrotactile actuator 104 may be integrated into inflatable bladder 102 during the manufacturing of inflatable bladder 102 and/or as a post-manufacturing process. One or multiple flexible haptic vibrotactile actuators 104 may be integrated into Inflatable bladder 102. In some examples, inflatable bladder 102 may be manufactured of a flexible electroactive material and may be configured to function independently and/or simultaneously as both an inflatable bladder and a flexible haptic vibrotactile actuator.

As shown in FIG. 2, haptic vibrotactile system 100 may be inflated to a distance D. Inflatable bladder 102 may be configured to inflate upon receipt of a pressurized fluid from a pressurized fluid source through fluid port 108. Inflatable bladder 102 may receive an amount of pressurized fluid causing haptic vibrotactile system 100 to inflate to distance D. The amount of pressurized fluid received by inflatable bladder 102 may be controlled by a haptic controller (e.g., haptic controller 806 of FIG. 8). In some examples, distance D may be a distance between a body part of a user (e.g., a finger) and an inside surface of a wearable article including haptic vibrotactile system 100 that is donned by the user (e.g., a glove). Further, the amount of pressurized fluid received by inflatable bladder 102 may determine a pressure inside inflatable bladder 102 and therefore a force and/or pressure exerted by haptic vibrotactile system 100 against the body part of the user and an inside surface of the wearable article including haptic vibrotactile system 100 that is donned by the user.

Figure 3:
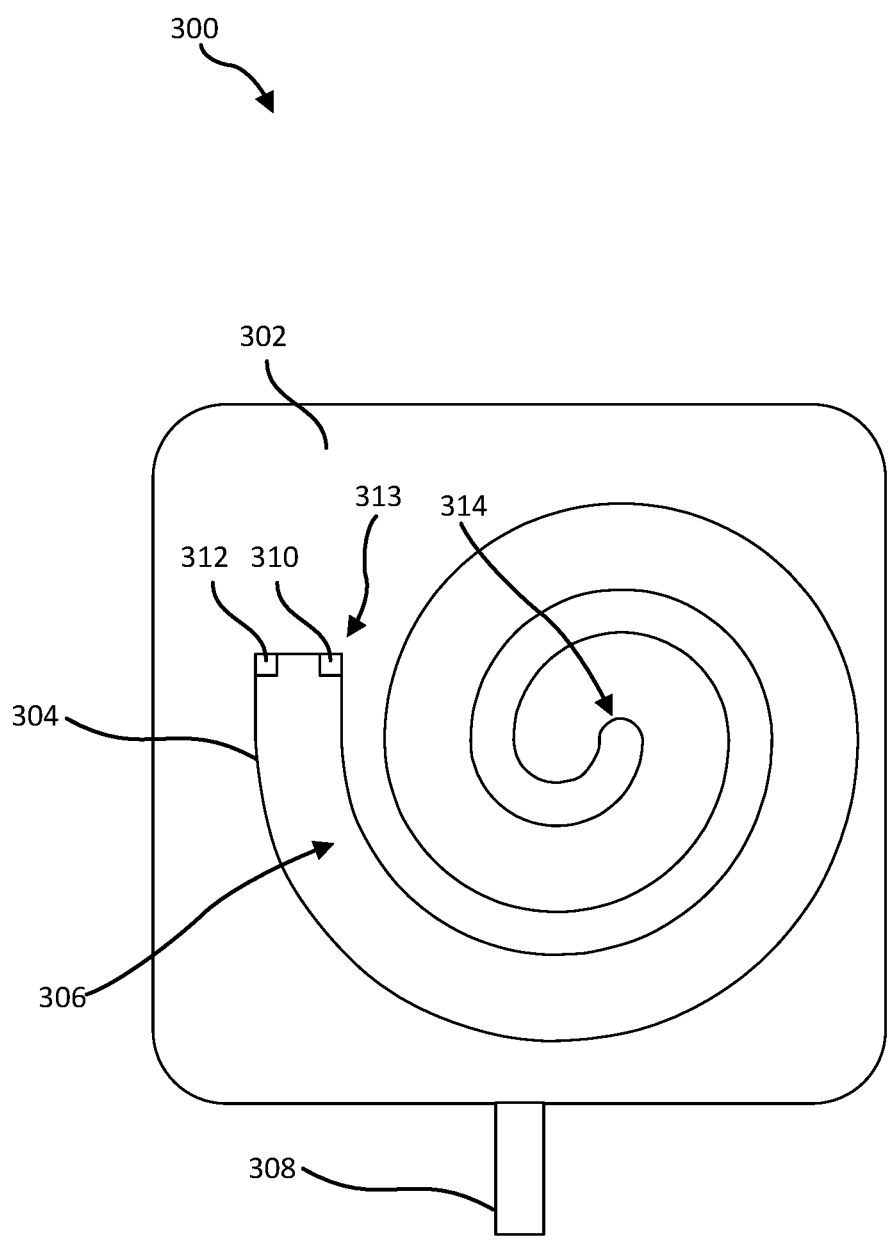
FIG. 3 is a plan view of a spiral-shaped flexible haptic vibrotactile actuator on or in an inflatable bladder according to at least one embodiment of the present disclosure.

FIG. 3 illustrates a haptic vibrotactile actuator system 300 (also referred to as "system 300" for simplicity) that may include an inflatable bladder 302 and a spiral-shaped flexible haptic vibrotactile actuator 304 positioned on or in inflatable bladder 302 such that inflation and deflation of inflatable bladder 302 may alter a vibrotactile sensation (e.g., a vibration sensation) induced by spiral-shaped flexible haptic vibrotactile actuator 304 when activated. For example, spiral-shaped flexible haptic vibrotactile actuator 304 may include a flexible electroactive material 306 positioned on or in inflatable bladder 302.

Inflatable bladder 302 may include at least one fluid port 308 positioned and configured to inflate and/or deflate inflatable bladder 302. For example, fluid port 308 may be configured to inflate inflatable bladder 302 upon receipt of a pressurized fluid from a pressurized fluid source. Inflatable bladder 302 may have the same or similar characteristics as inflatable bladder 102 of FIG. 1 described above. Further, spiral-shaped flexible haptic vibrotactile actuator 304 may have the same or similar characteristics as flexible haptic vibrotactile actuator 104 of FIG. 1 described above. Additionally or alternatively, spiral-shaped flexible haptic vibrotactile actuator 304 may exhibit an increased displacement out-of-plane upon actuation by a sufficient voltage (e.g., a voltage applied by haptic actuator driver 840 of FIG. 8) applied to first electrode pad 310 and second electrode pad 312, as compared to a similar actuator that may have a linear configuration positioned on or in inflatable bladder 302. For example, a linear actuator extending from a first end 313 of spiral-shaped flexible haptic vibrotactile actuator 304 to a second end 314 may exhibit a relatively small displacement. However, spiral-shaped flexible haptic vibrotactile actuator 304 following a spiral path from first end 313 (e.g., an outer end) to second end 314 (e.g., an inner end) may exhibit a relatively large displacement, due to the increased length of spiral-shaped flexible haptic vibrotactile actuator 304.

Figure 4:
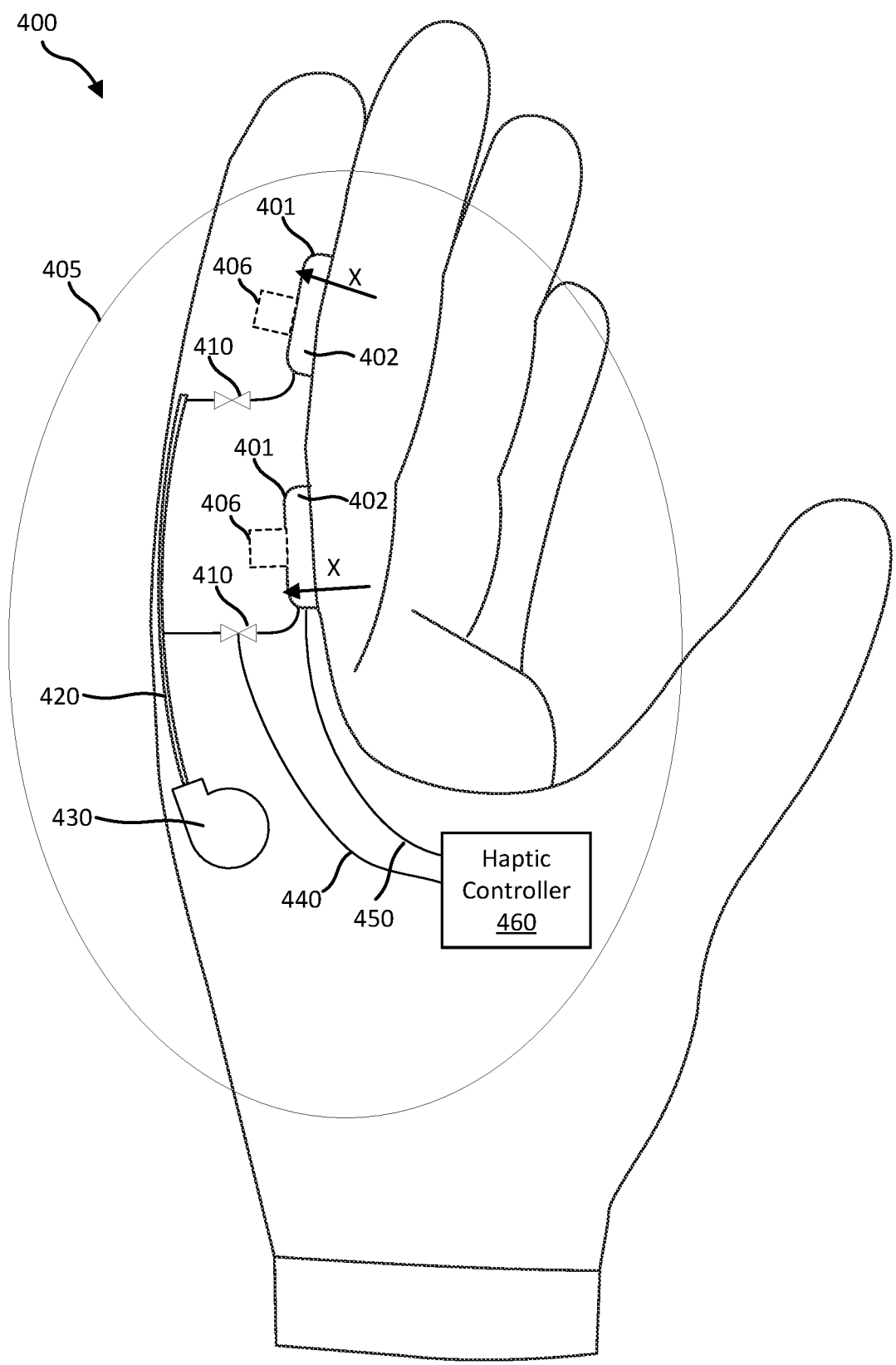
FIG. 4 is a perspective view of a wearable article incorporating a haptic controller and flexible haptic vibrotactile actuators on or in inflatable bladders according to at least one embodiment of the present disclosure.

FIG. 4 illustrates an example wearable article 400 incorporating a haptic vibrotactile actuator system 405 that may include at least one inflatable bladder. Referring to FIG. 4, wearable article 400 (e.g., a glove) may include multiple haptic vibrotactile actuators 401 positioned in or on inflatable bladders 402. By way of example and not limitation, wearable article 400 is illustrated in FIG. 4 as a glove. However, wearable article 400 may be any of wearable articles described in FIGS. 10-15 below or another wearable article. Wearable article 400 may include haptic vibrotactile actuator system 405 that induces haptic vibration in flexible haptic vibrotactile actuators 401 positioned on or in an at least partially deflated inflatable bladders 402. Inflatable bladders 402 may be supported by wearable article 400 and the haptic vibration may be transmitted to an intended user donning wearable article 400. In some examples, inflating inflatable bladder 402 may apply a haptic sensation (e.g., a pressure) against the user in a direction indicated by arrow X. The pressure applied against the user in direction X may be a direction substantially perpendicular to a surface of the user's skin. In operation, haptic vibrotactile actuator system 405 may induce an additional haptic sensation (e.g., a pressure and a vibration) with flexible haptic vibrotactile actuator 401 by inflating inflatable bladder 402 to transmit the pressure and apply a sufficient voltage to the electrodes (e.g., electrodes 110 and 112 of FIG. 1) of flexible haptic vibrotactile actuator 401 to produce a haptic vibration. Wearable article 400 may induce the applied haptic pressure alone, the haptic vibration alone, or the applied haptic pressure and the haptic vibration simultaneously. By having the ability to apply haptic pressure and haptic vibration independently or simultaneously, wearable article 400 may be configured provide an increased level of control and an alternative user experience in haptic feedback, such as in an artificial-reality application.

Figure 5:
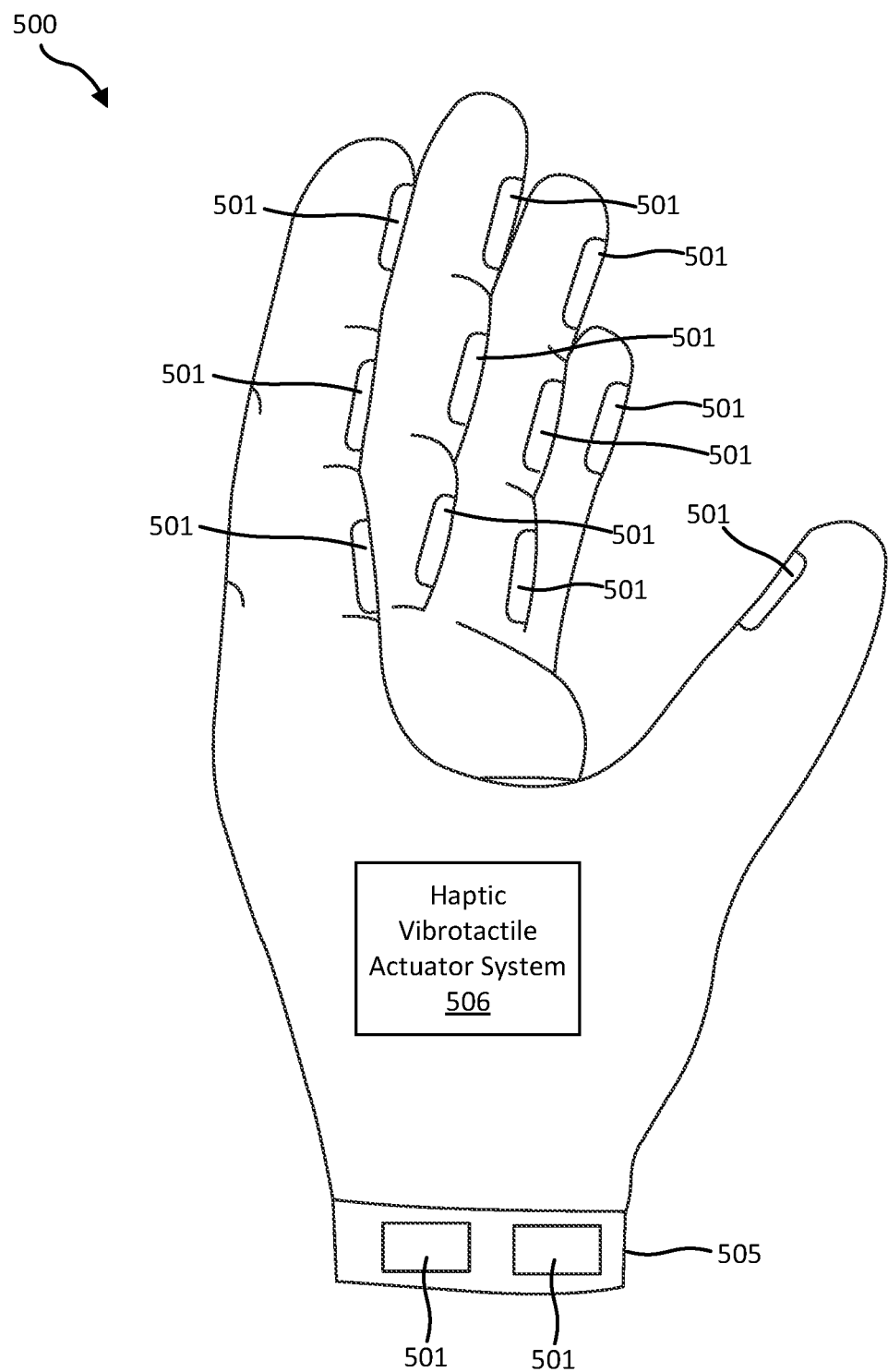
FIG. 5 is a perspective view of a wearable article incorporating an array of flexible haptic vibrotactile actuators on or in inflatable bladders according to at least one embodiment of the present disclosure.
Figure 6:
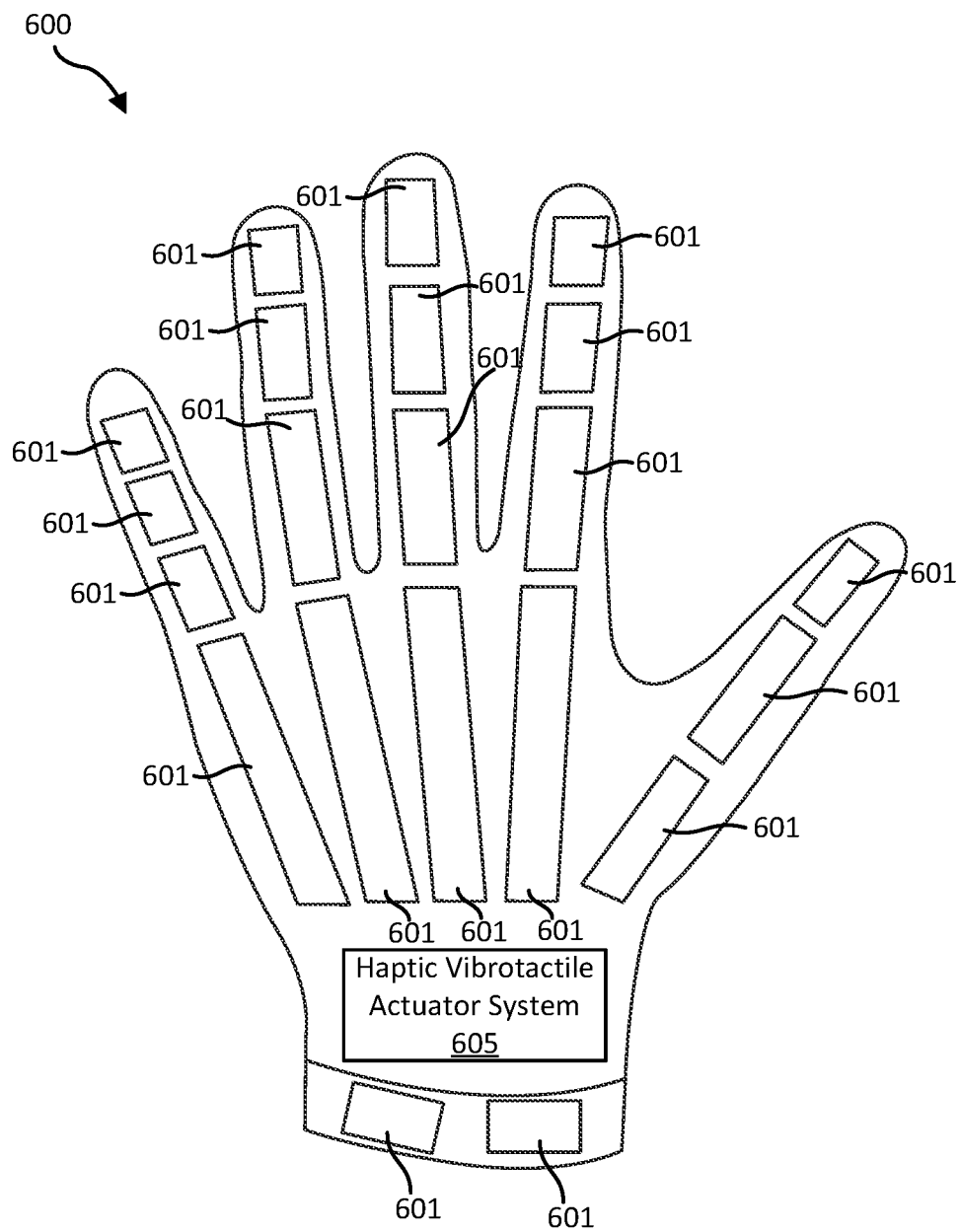
FIG. 6 is a top plan view of a wearable article incorporating an array of flexible haptic vibrotactile actuators on or in inflatable bladders according to at least one embodiment of the present disclosure.

Although FIG. 4 shows two flexible haptic vibrotactile actuators 401, the present disclosure is not so limited. For example, FIGS. 5 and 6 show wearable articles with multiple flexible haptic vibrotactile actuators arranged in arrays. Flexible haptic vibrotactile actuator 401 may be positioned on or in inflatable bladder 402 that has the characteristics of inflatable bladder 102 described above with respect to FIG.

1. Inflatable bladder 402 may receive a positively pressurized fluid from a pressurized fluid source 430. Pressurized fluid source 430 may be any device or system that creates a pressurized fluid for injecting into inflatable bladder 402 to alter a physical property (e.g., displacement, volume, etc.) of inflatable bladder 402. Pressurized fluid source 430 may include, without limitation, a fan, a piston, a valve, a pump, a pressurized chamber, a compressor, another fluidic device, or a combination thereof. In some examples, each of inflatable bladders 402 may receive the same pressure level of pressurized fluid, or certain inflatable bladders 402 may receive a different pressure level of pressurized fluid. Each of inflatable bladders 402 may be connected to a valve 410 that controls a flow of pressurized fluid from pressurized fluid source 430 to inflatable bladders 402. Valve 410 (e.g., a microelectromechanical valve) may be a multiport and/or multi-position valve that allows fluid to flow from pressurized fluid source 430 through a fluid channel 420 (e.g., a manifold) to valve 410. When valve 410 is in a first position, pressurized fluid may flow from fluid channel 420 to inflatable bladder 402. When valve 410 is in a second position, pressurized fluid may be contained within inflatable bladder 402. When valve 410 is in a third position, the pressurized fluid within inflatable bladder 402 may be returned through fluid channel 420 to pressurized fluid source 430 and/or exhausted to an ambient atmosphere.

Further, pressurized fluid source 430 may provide a negatively pressurized fluid source (e.g., a pressure sink) capable of drawing fluid away from inflatable bladder 402, thereby deflating inflatable bladder 402. In some examples, inflatable bladder 402 may be constructed of an elastic material such that inflatable bladder 402 inflates upon receiving a positively pressurized fluid and deflates upon receiving a negatively pressurized fluid (e.g., upon exhausting the fluid). Inflatable bladder 402 may exhaust the fluid through valve 410.

Wearable article 400 may include a haptic controller 460. Haptic controller 460 may be haptic controller 806 described below with respect to FIG. 8. Each of inflatable bladders 402 may receive a pressurized fluid from pressurized fluid source 430. Haptic controller 460 may control the amount and the timing of pressurized fluid to each of inflatable bladders 402. For example, haptic controller 460 may control valves 410 through control line 440 thereby controlling the amount and the timing of pressurized fluid to each of inflatable bladders 402. Further, each of inflatable bladders 402 may be coupled to pressure sensor 406 that measures the pressure level of the pressurized fluid. Haptic controller 460 may be configured to control a programmable pressure in inflatable bladders 402 by controlling the flow of pressurized fluid to inflatable bladders 402 (e.g., individually or collectively) and measuring the pressure level of the pressurized fluid. Haptic controller 460 may be further configured to control a haptic vibration in flexible haptic vibrotactile actuators 401 by providing a voltage signal to the electrodes on opposite sides of flexible haptic vibrotactile actuators 401. Haptic controller 460 may provide the voltage signal to flexible haptic vibrotactile actuators 401 through electrical conduit 450 (e.g., discrete wires or a bus). Haptic controller 460 may control the application of haptic pressure and haptic vibration independently or simultaneously to a user donning wearable article 400. Wearable article 400 may provide an increased level of control and an alternative user experience in haptic feedback, such as in an artificial-reality application.

FIG. 5 illustrates a wearable article 500 incorporating a haptic vibrotactile actuator system 506 that may include multiple inflatable bladders. As described above with respect to FIG. 4, wearable article 500 may include multiple inflatable bladders 501 incorporating flexible haptic vibrotactile actuators. Wearable article 500 shows a wearable article (e.g., a glove) that incorporates multiple inflatable bladders 501 on an interior surface of wearable article 500 adjacent to the distal, middle, and proximal phalanges of a user's fingers. Wearable article 500 may also incorporate multiple inflatable bladders 501 on interior surfaces of other areas, such as wrist area 505.

Inflatable bladders 501 incorporating flexible haptic vibrotactile actuators on an interior section of wearable article 500 may improve a user experience when wearable article 500 is used in an artificial-reality application, such as gaming. For example, a user donning wearable article 500 may play an artificial-reality game in which the user grips a virtual object (e.g., a ball, a weapon, a steering wheel, etc.) generated and displayed by an artificial-reality system and the user receives haptic feedback via wearable article 500 in coordination with the game. The haptic feedback received by the user may include haptic pressure via inflatable bladder 501 and/or haptic vibration via flexible haptic vibrotactile actuators incorporated in or on inflatable bladder 501.

FIG. 6 illustrates another wearable article 600 incorporating a haptic vibrotactile actuator system 605 that may include multiple inflatable bladders 601. As described above with respect to FIG. 4, wearable article 600 may include multiple inflatable bladders 601 incorporating flexible haptic vibrotactile actuators. Wearable article 600 shows a wearable article (e.g., a glove) that incorporates multiple inflatable bladders 601 on an interior section of wearable article 600 adjacent to the top side of a user's hand, fingers, and wrist. Wearable article 600 may be constructed of a fabric material that conforms to the body part (e.g., a hand) of the user donning wearable article 600. Wearable article 600 may be constructed of a compliant material that conforms to the shape of the user's hand as the user moves the hand. Further, flexible haptic vibrotactile actuators may be secured (e.g., glued, fastened, printed, laminated, etc.) to inflatable bladders 601 such that the flexible haptic vibrotactile actuator and inflatable bladders 601 are configured to flex together as a unit in response to an external force applied to wearable article 600, such as when the user moves (e.g., bends, twists, squeezes, etc.) wearable article 600. Configuring the flexible haptic vibrotactile actuator and inflatable bladder 601 to flex together as a unit contributes to enabling the independent and/or simultaneous application of haptic pressure and haptic vibration on the user.

Figure 7:
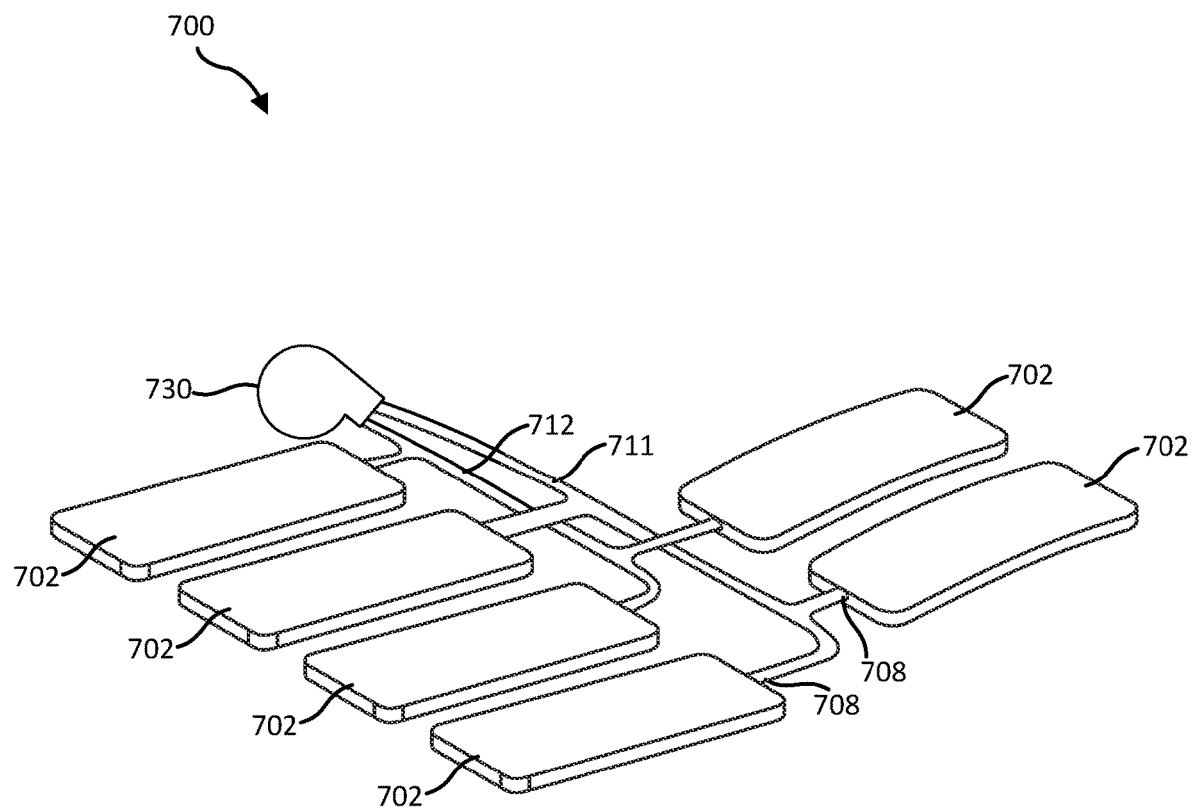
FIG. 7 is a perspective view of an array of inflatable bladders and a fluid pressure source according to at least one embodiment of the present disclosure.

FIG. 7 illustrates multiple inflatable bladders 702 arranged in a bladder array 700. Bladder array 700 may be supported by (e.g., integrated into) a wearable article, such as the wearable articles shown in FIGS. 4-6 and 10-15. Inflatable bladders 702 may be arranged within an associated wearable article to provide haptic pressure to a user donning the article. Flexible haptic vibrotactile actuators may be incorporated within an interior of inflatable bladders 702 or on an exterior of inflatable bladders 702 and may be configured to provide haptic vibration to a user donning the article. Bladders 702 may be independently inflated and/or deflated as described with respect to FIG. 4 or inflatable bladders 702 may be inflated and/or deflated in groups as shown in FIG. 7. Inflatable bladders may be inflated and/or deflated in groups by connecting a fluid port 708 of each inflatable bladder 702 in the group to manifold 711 and/or manifold 712. Manifold 711 and manifold 712 may provide a common fluid pressure to each fluid port 708 in a group of fluid ports 708 connected thereto, thereby inflating each inflatable bladder 702 in the group to a common pressure. Manifold 711 may provide a different pressure to a group of inflatable bladders 702 than manifold 712. Manifold 711 and manifold 712 may be coupled to a pressurized fluid source 730 that provides the pressurized fluid for groups of inflatable bladders 702. In some examples, a haptic controller (e.g., haptic controller 460 of FIG. 4 or haptic controller 806 of FIG. 8) may control a valve (e.g., valve 410 of FIG. 4 or valve 813 of FIG. 8) that controls the flow of pressurized fluid to manifold 711 and manifold 712. Further, a pressure sensor (e.g., pressure sensor 844 of FIG. 8) may measure the fluid pressure in manifold 711 and manifold 712 and may provide the measured pressure to the haptic controller in order to execute closed loop pressure control of inflatable bladders 702.

FIG. 8 is a block diagram of an artificial-reality system 800. Referring to FIG. 8, artificial-reality system 800 may, for example, be the augmented-reality system of FIG. 11 or of FIG. 15 or the virtual-reality system of FIG. 12 or of FIG. 14. Artificial-reality system 800 may present artificial-reality content (e.g., audio, video, etc.) to a user via head-mounted display system 805. Artificial-reality system 800 may also induce haptic feedback to the user in connection (e.g., in temporal synchronization) with the artificial reality content. For example, head mounted display system 805 may present (e.g., simultaneously present) video content to a user on a display, present audio content to a user through a speaker, induce a haptic pressure sensation to the user, transmit a vibrotactile sensation to the user through a wearable article with integrated flexible haptic vibrotactile actuators positioned on or in inflatable bladders, or any combination thereof. Artificial-reality system 800 may alter the stiffness of the inflatable bladder (e.g., inflatable bladder 102, 202, 402, 501, 601, or 702) thereby altering at least one characteristic of the vibrotactile sensation experienced by the user. For example, altering the stiffness of the inflatable bladder with a flexible haptic vibrotactile actuator positioned on or in the inflatable bladder may increase the intensity of the vibrotactile sensation, decrease the intensity of the vibrotactile sensation, increase the perceived frequency of the vibrotactile sensation, decrease the perceived frequency of the vibrotactile sensation, or a combination thereof. Artificial-reality system 800 may be configured to increase the vibrotactile sensation induced by the flexible haptic vibrotactile actuator in response to inflating the inflatable bladder with pressurized fluid from a pressurized fluid source.

For example, a user may play a tennis game on artificial-reality system 800 that presents a virtual tennis ball moving towards the user as viewed on head-mounted display 805 and the user may swing a virtual tennis racket and make virtual contact with the tennis ball. As the user swings the tennis racket, artificial-reality system 800 may induce a haptic pressure sensation to the user that simulates gripping and swinging the tennis racket by inflating inflatable bladders 803(1)-803(n) within a glove (e.g., the glove shown in any of FIG. 4-6, 13, or 14) donned by the user. Upon intended contact, the user may simultaneously see the virtual tennis ball contacting the racket and feel a vibrotactile sensation induced by flexible haptic vibrotactile actuators 804(1)-804(n) positioned within an interior and/or on an exterior of inflatable bladders 803(1)-803(n) that simulates the impact felt by a user contacting a tennis ball with a tennis racket. The user may also simultaneously hear a sound simulating contact of the ball with the racket. Artificial-reality system 800 may provide video, audio, haptic pressure sensation, and vibrotactile sensation in temporal synchrony to a user thereby creating a multimodal sensory experience for the user and increasing the immersiveness of the content consumed by the user.

Artificial-reality system 800 may also include a haptic vibrotactile actuator controller ("haptic controller") 806. Haptic controller 806 may include a local processor 820, an amplitude frequency controller 830, a haptic actuator driver 840, and/or an inflatable bladder controller 842. Haptic controller 806 may provide control signals (e.g., voltages of varying frequency, amplitude, duty cycle, etc.) for actuating flexible haptic vibrotactile actuators 804(1)-804(n) and for controlling inflation/deflation of inflatable bladders 802(1)-802(n) in connection with (e.g., in substantial temporal synchronization) content displayed on head-mounted display 805. Flexible haptic vibrotactile actuators 804(1)-804(n) may be positioned within an interior or on an exterior of inflatable bladders 802(1)-802(n), respectively. Temporal synchronization between the audio, video, and haptic feedback content may occur within a threshold time period (e.g., milliseconds) depending on latencies introduced in the communications and processing paths. Head-mounted display 805 may include a wireless communications unit (e.g., Bluetooth™, WiFi, NFC, etc.) for communicating control signals to local processor 820. The control signals may include haptic feedback content to be provided to a user in synchronization with content displayed on head-mounted display 805. Local processor (e.g., a microcontroller, a central processing unit, etc.) 820 may also include a wireless communications unit for receiving the control signals including haptic feedback content. Haptic controller 806 may be integrated into a wearable article (e.g., a glove) that includes flexible haptic vibrotactile actuators 804(1)-804(n) and inflatable bladders 802(1)-802(n). Local processor 820 may decode the received control signals and provide the haptic feedback content to amplitude/frequency controller 830 (e.g., a digital signal processor, a microcontroller, etc.) and inflatable bladder controller 842. Amplitude/frequency controller 830 may convert the haptic feedback content into voltage waveforms (e.g., sinewave, sawtooth, square, triangle, chirp, etc.) of varying amplitude, frequency, duty cycle, modulation (e.g., amplitude modulation, frequency modulation) and/or envelope that drives flexible haptic vibrotactile actuators 804(1)-804(n) thereby providing vibratory haptic feedback to the user. Haptic actuator driver 840 may receive the voltage waveforms from amplitude/frequency controller 830 and condition the waveforms for driving flexible haptic vibrotactile actuators 804(1)-804(n). Haptic actuator driver 840 may perform impedance matching, level shifting, amplification, etc., as may be required to drive flexible haptic vibrotactile actuators 804(1)-804(n).

Inflatable bladder controller 842 may convert the haptic feedback content into control signals that control pressurized fluid source 843 and/or valves 813. Inflatable bladder controller 842 may open or close valves 813 to allow pressurized fluid from pressurized fluid source 843 to be received by inflatable bladders 802(1)-802(n) thereby inflating or deflating inflatable bladders 802(1)-802(n). Inflatable bladder controller 842 may also control pressurized fluid source 843 by activating and deactivating pressurized fluid source 843 and/or controlling a pressure level of the fluid in pressurized fluid source 843. As described above with respect to FIG. 4, a closed loop control system may be used to control the pressure of the fluid in inflatable bladders 802(1)-802(n) and thereby control the level of haptic pressure applied to the user. Pressure sensor 844 may measure to pressure within inflatable bladders 802(1)-802(n) and/or measure the pressure within a fluid port or manifold coupled to inflatable bladders 802(1)-802(n). The fluid pressure measurements from pressure sensor 844 may be read by local processor 820. Local processor 820 may send control signals to inflatable bladder controller 842 in order to adjust the fluid pressure to a programmable setpoint. The pressure setpoint may be based on the content playing in head-mounted display system 805. For example, haptic controller 806 may control the programmable bladder pressure to simulate an interaction between a user and a virtual object (e.g., a ball, a weapon, a tennis racket, etc.) displayed on head-mounted display system 805.

Haptic actuator driver 840 may apply the voltage waveforms for driving (e.g., actuating) flexible haptic vibrotactile actuators 804(1)-804(n) to first electrodes 810 and/or second electrodes 812. In some examples, the voltage waveforms may be applied to one electrode (e.g., first electrode 810) while the other electrode (e.g., second electrode 812) is connected to ground. Alternatively, a differential voltage waveform may be applied to first electrode 810 and second electrode 812.

In some embodiments, a wearable article may include multiple (e.g., an array) of flexible haptic vibrotactile actuators 804(1)-804(n) and/or an array of inflatable bladders 802(1)-802(n). Haptic controller 806 may provide control signals for an array of flexible haptic vibrotactile actuators 804(1)-804(n) and/or an array of inflatable bladders 802(1)-802(n) distributed across the wearable article to provide different types and intensities of haptic feedback to a user. In some examples, artificial-reality system 800 may include another haptic controller 806 that may provide control signals for another array of flexible haptic vibrotactile actuators 804(1)-804(n) and/or another array of inflatable bladders 802(1)-802(n) distributed across another wearable article (e.g., a pair of gloves worn by the user). The other haptic controller 806 may also be communicatively coupled to head-mounted display system 805 and configured to apply another pressure sensation and/or vibrotactile sensation to the user in connection with the content presented on head-mounted display 805.

In some examples, flexible haptic vibrotactile actuators 804(1)-804(n) may have a broadband frequency response and may be able to provide haptic feedback (e.g., haptic stimulus) to a human user across a wide range of frequencies. By way of example, the frequencies of the haptic feedback may be in the range of 1 Hz to over 600 Hz. In some examples, flexible haptic vibrotactile actuators 804(1)-804(n) may have a narrow-band frequency response based on the characteristics and shapes (e.g., a spiral shape) described in detail above and may only provide haptic feedback to a user across a narrow range of frequencies. Flexible haptic vibrotactile actuators 804(1)-804(n) may be narrow-band actuators and each actuator may have a different frequency response band. Due to the resonance of the haptic actuator, each of flexible haptic vibrotactile actuators 804(1)-804(n) may have a frequency band corresponding to its resonant frequency. In order to provide a wideband haptic feedback experience to a user, flexible haptic vibrotactile actuators 804(1)-804(n) may each have a different frequency response band. In order to provide a wideband haptic feedback, haptic actuator driver 840 may control the frequency of voltage waveforms to match the frequency response characteristics of each of flexible haptic vibrotactile actuators 804(1)-804(n) in order to create an improved experience for a user receiving the haptic feedback. In some examples, inflatable bladders 802(1)-802(n) may alter a characteristic (e.g., a stiffness) of flexible haptic vibrotactile actuators 804(1)-804(n) upon inflation or deflation of inflatable bladders 802(1)-802(n) and therefore alter a characteristic (e.g., a frequency response, an intensity, etc.) of the vibrotactile sensation transmitted to the user.

In some examples, haptic controller 806 may provide control signals that induce haptic vibration in flexible haptic vibrotactile actuators 804(1)-804(n) positioned on or in an at least partially deflated inflatable bladders 802(1)-802(n) to an intended user donning the wearable article. Haptic controller 806 may provide control signals to inflate the inflatable bladder to apply a pressure against the intended user and induce additional haptic vibration in the flexible haptic vibrotactile actuators 804(1)-804(n) positioned on or in the inflated inflatable bladders 802(1)-802(n) to transmit the additional haptic vibration to the intended user simultaneous with the applied pressure. In some examples, the simultaneous application of pressure and haptic vibration to the user may result in a cumulative haptic stimulus rendered to the user. The cumulative haptic stimulus may provide a perception of greater intensity of haptic stimulus to the user as compared to an individual (e.g., non-simultaneous) application of haptic vibration or an individual application of pressure to the user. This perceived increase in intensity may result from inflation of the bladder(s) without changing the waveform of the haptic vibration. For example, the simultaneous application of pressure and haptic vibration to the user may have a multiplicative effect in the cumulative haptic stimulus rendered to and/or perceived by the user.

Artificial-reality system 800 described above may be incorporated in a wearable article (e.g., a glove, a headband, a sleeve, a bracelet, a watch band, a neck band, a sock, a shoe, a hat, etc.), such as any of the wearable articles described below with reference to FIGS. 10-15. Artificial-reality system 800 may be incorporated in the wearable articles in a position to induce haptic vibrational feedback (e.g., from flexible haptic vibrotactile actuator 804(1)) and/or pressure haptic feedback (e.g., from inflatable bladder 802(1)) to a single location on a user when the wearable article is donned by the user.

FIG. 9 is a flow diagram illustrating a method 900 of operating a flexible haptic vibrotactile actuator. At operation 910, haptic vibration may be induced in electroactive material of the flexible haptic vibrotactile actuator positioned on or in an at least partially deflated inflatable bladder supported by a wearable article, such as to transmit the haptic vibration to a user donning the wearable article. Operation 910 may be performed in a variety of ways. For example, an electrical voltage may be applied to electrodes of the electroactive material (e.g., as described with respect to FIG. 8) to induce the haptic vibration.

At operation 920, the inflatable bladder may be inflated, such as to induce a pressure against the user. Operation 920 may be performed in a variety of ways. For example, an interior of the inflatable bladder may be exposed to an increased fluid pressure, relative to a surrounding environmental (e.g., atmospheric) pressure. A fan, a piston, a valve, a pump, a pressurized chamber, a compressor, or other pressurized fluid source may be used to inflate the inflatable bladder through at least one fluid port (e.g., as described with respect to FIGS. 4, 7 and 8).

At operation 930, additional haptic vibration may be induced in the flexible haptic vibrotactile actuator positioned on or in the inflated inflatable bladder, such as to transmit the additional haptic vibration to the user simultaneous with the induced pressure. Operation 930 may be performed in a variety of ways, as discussed above with relation to operation 910. The inflated inflatable bladder may increase a stiffness of the flexible haptic vibrotactile actuator, which may provide a different sensation (e.g., a stronger vibration) to the user compared to a sensation when the inflatable bladder is at least partially deflated.

Accordingly, the present disclosure includes devices, systems, and methods that may be employed to improve and provide alternative modes of haptic sensations. For example, an artificial-reality system may include a wearable article(s) that includes haptic vibrotactile actuators positioned on or in inflatable bladders. The haptic vibrotactile actuators and inflatable bladders may provide haptic feedback to an intended user when the wearable article is donned by the intended user. The flexible haptic vibrotactile actuator may include an electroactive material that is configured to vibrate upon application of a sufficient electrical voltage thereto. For example, inflation and deflation of the inflatable bladder may alter a vibrotactile sensation induced by the flexible haptic vibrotactile actuator when activated, such as by altering a stiffness of the flexible haptic vibrotactile actuator. Additionally or alternatively, three modes of haptic feedback may be provided to a user donning a wearable article including the haptic vibrotactile actuator system, namely a pressure sensation upon inflation of the inflatable bladder, a vibrotactile sensation upon activation of the flexible haptic vibrotactile actuator, and a combined pressure sensation and vibrotactile sensation. The haptic feedback may be provided to the intended user in connection with audio/video content in order to create a more compelling artificial-reality experience.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 1000 in FIG. 10. Other artificial-reality systems may include an NED that also provides visibility into the real world (e.g., augmented-reality system 1100 in FIG. 11) or that visually immerses a user in an artificial reality (e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
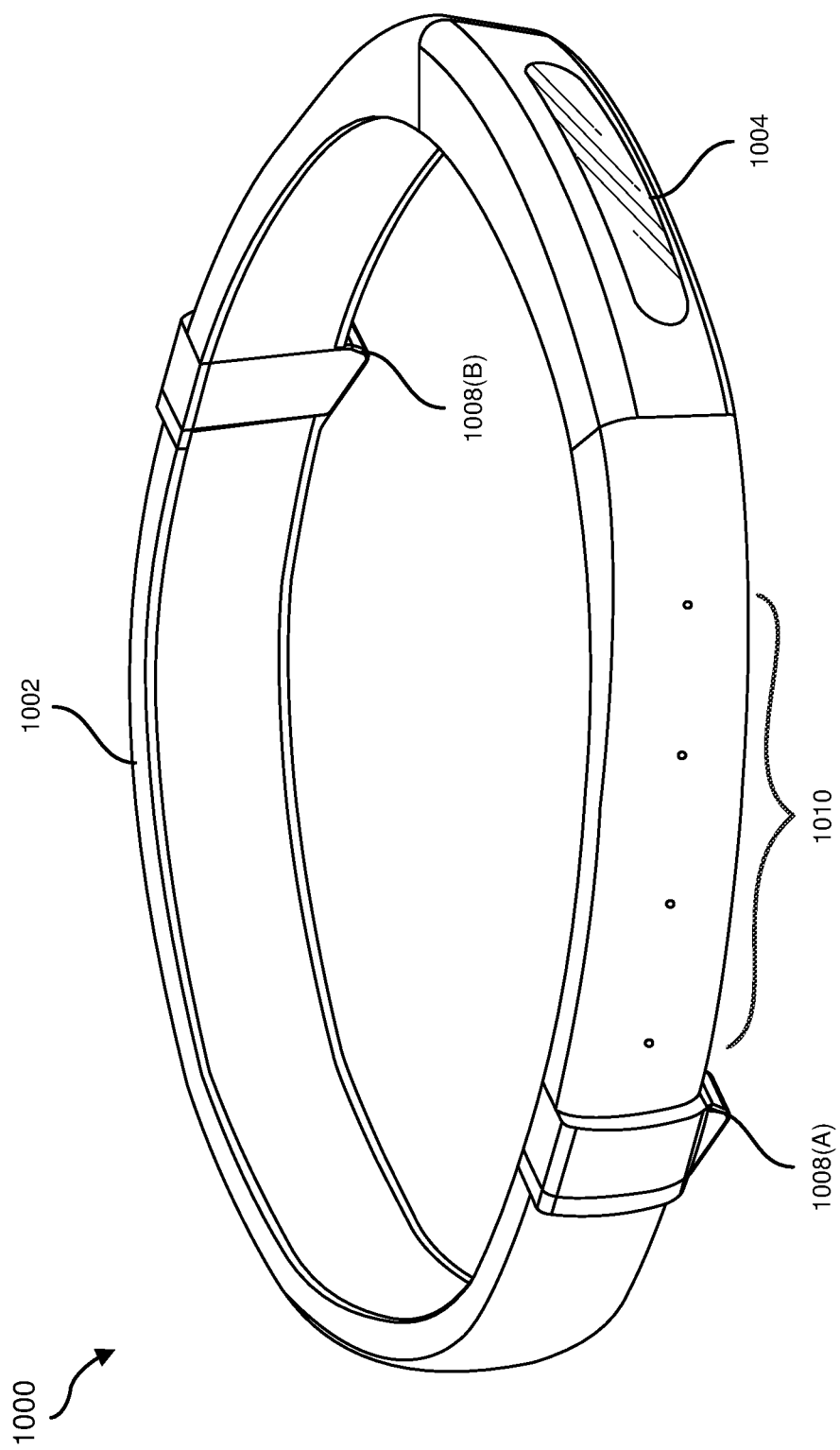
FIG. 10 is an illustration of an example artificial-reality headband that may be used in connection with embodiments of this disclosure.

Turning to FIG. 10, augmented-reality system 1000 generally represents a wearable device dimensioned to fit about a body part (e.g., a head) of a user. As shown in FIG. 10, system 1000 may include a frame 1002 and a camera assembly 1004 that is coupled to frame 1002 and configured to gather information about a local environment by observing the local environment. Augmented-reality system 1000 may also include one or more audio devices, such as output audio transducers 1008(A) and 1008(B) and input audio transducers 1010. Output audio transducers 1008(A) and 1008(B) may provide audio feedback and/or content to a user, and input audio transducers 1010 may capture audio in a user's environment.

As shown, augmented-reality system 1000 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1000 may not include an NED, augmented-reality system 1000 may include other types of screens or visual feedback devices (e.g., a display screen integrated into a side of frame 1002).

Figure 11:
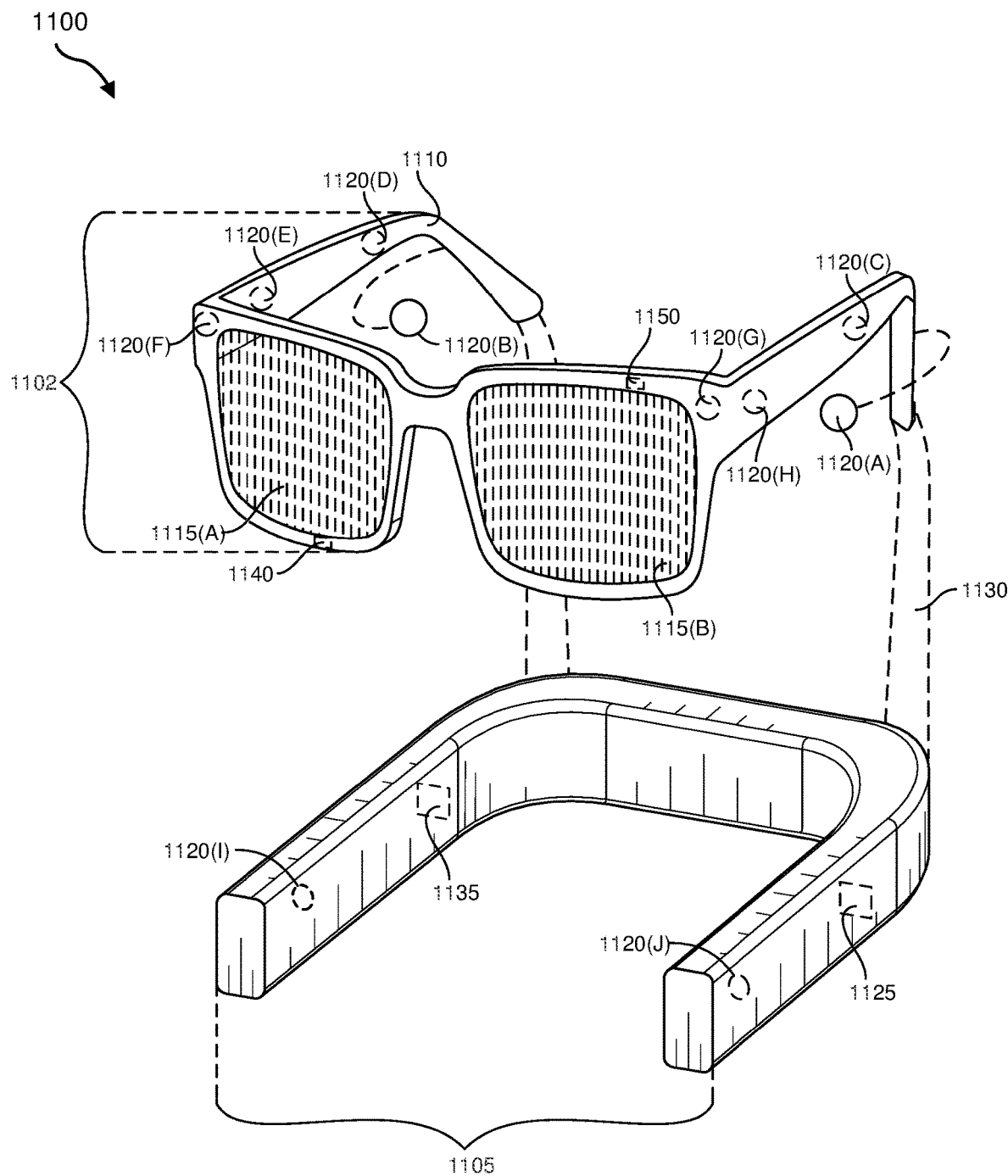
FIG. 11 is an illustration of example augmented-reality glasses that may be used in connection with embodiments of this disclosure.

The embodiments discussed in this disclosure may also be implemented in augmented-reality systems that include one or more NEDs. For example, as shown in FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent a position sensor, an inertial measurement unit (IMU), a depth camera assembly, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof. Augmented-reality system 1100 may also include a microphone array with a plurality of acoustic transducers 1120(A)-1120(J), referred to collectively as acoustic transducers 1120. Acoustic transducers 1120 may be transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(1) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments, acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned along the length of the temples, across the bridge, above or below display devices 1115(A) and 1115(B), or some combination thereof. Acoustic transducers 1120 may be oriented such that the microphone array is able to detect sounds in a wide range of directions surrounding the user wearing augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as a neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers and other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a standalone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(1) and 1120(J)) that are part of the microphone array (or potentially form their own microphone subarray). Neckband 1105 may also include a controller 1125 and a power source 1135.

Acoustic transducers 1120(1) and 1120(J) of neckband 1105 may be configured to detect sound and convert the detected sound into an electronic format (analog or digital). In the embodiment of FIG. 11, acoustic transducers 1120(1) and 1120(J) may be positioned on neckband 1105, thereby increasing the distance between neckband acoustic transducers 1120(1) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

A power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 1100 and/or virtual-reality system 1200 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 1000, augmented-reality system 1100, and/or virtual-reality system 1200 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 10 and 12, output audio transducers 1008(A), 1008(B), 1206(A), and 1206(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1010 may include condenser microphones, dynamic microphones, ribbon microphones, and/or any other type or form of input transducer. In some embodiments, a single transducer may be used for both audio input and audio output.

Figure 12:
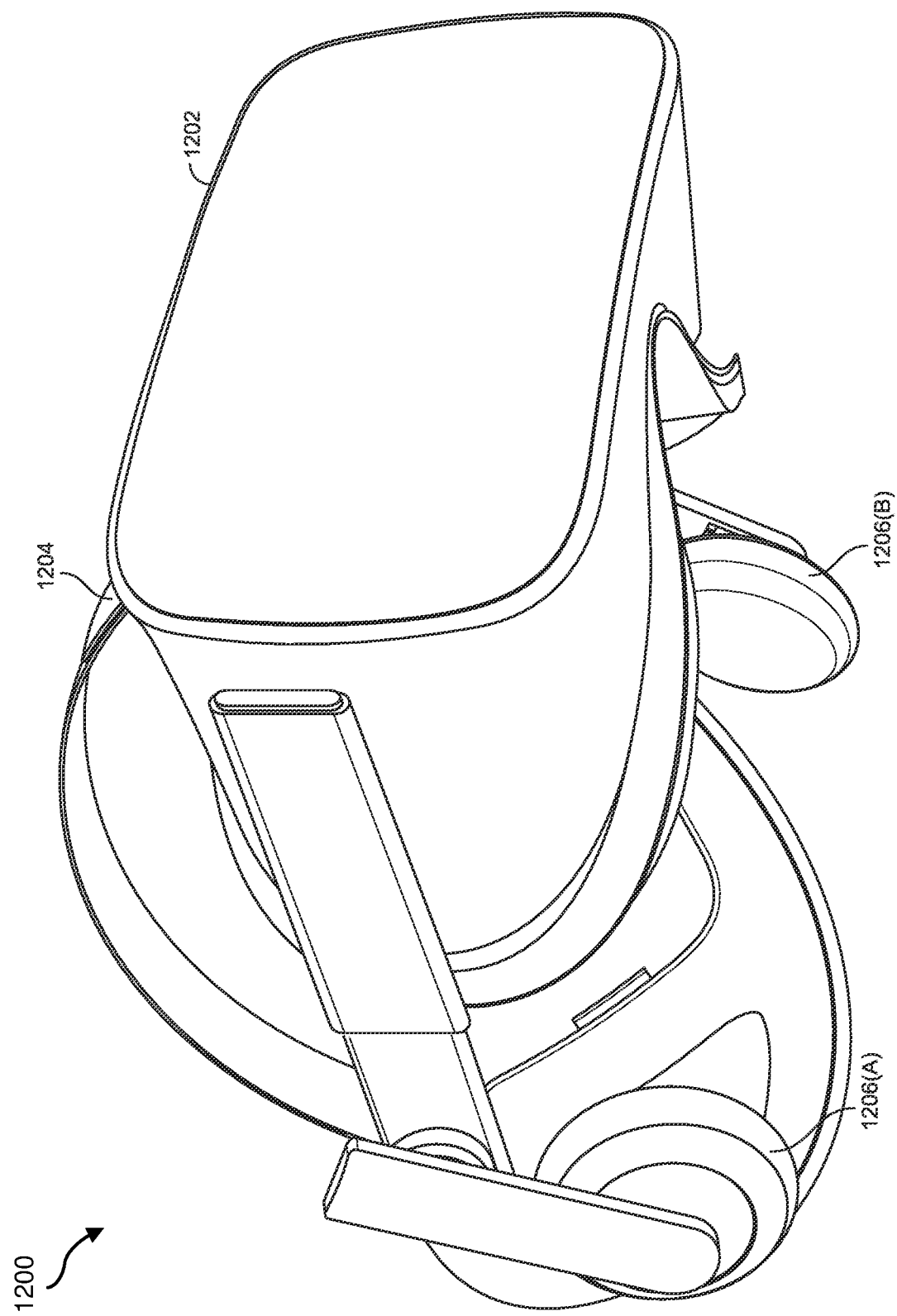
FIG. 12 is an illustration of an example virtual-reality headset that may be used in connection with embodiments of this disclosure.

While not shown in FIGS. 10-12, artificial-reality systems may include tactile (i.e., haptic) feedback systems, which may be incorporated into headwear, gloves, body suits, handheld controllers, environmental devices (e.g., chairs, floormats, etc.), and/or any other type of device or system. By way of example and not limitation, any of actuators 100, 200, 401, 501, or 601 described above with reference to FIGS. 1-7 may be implemented in an artificial-reality system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 1000, 1100, and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
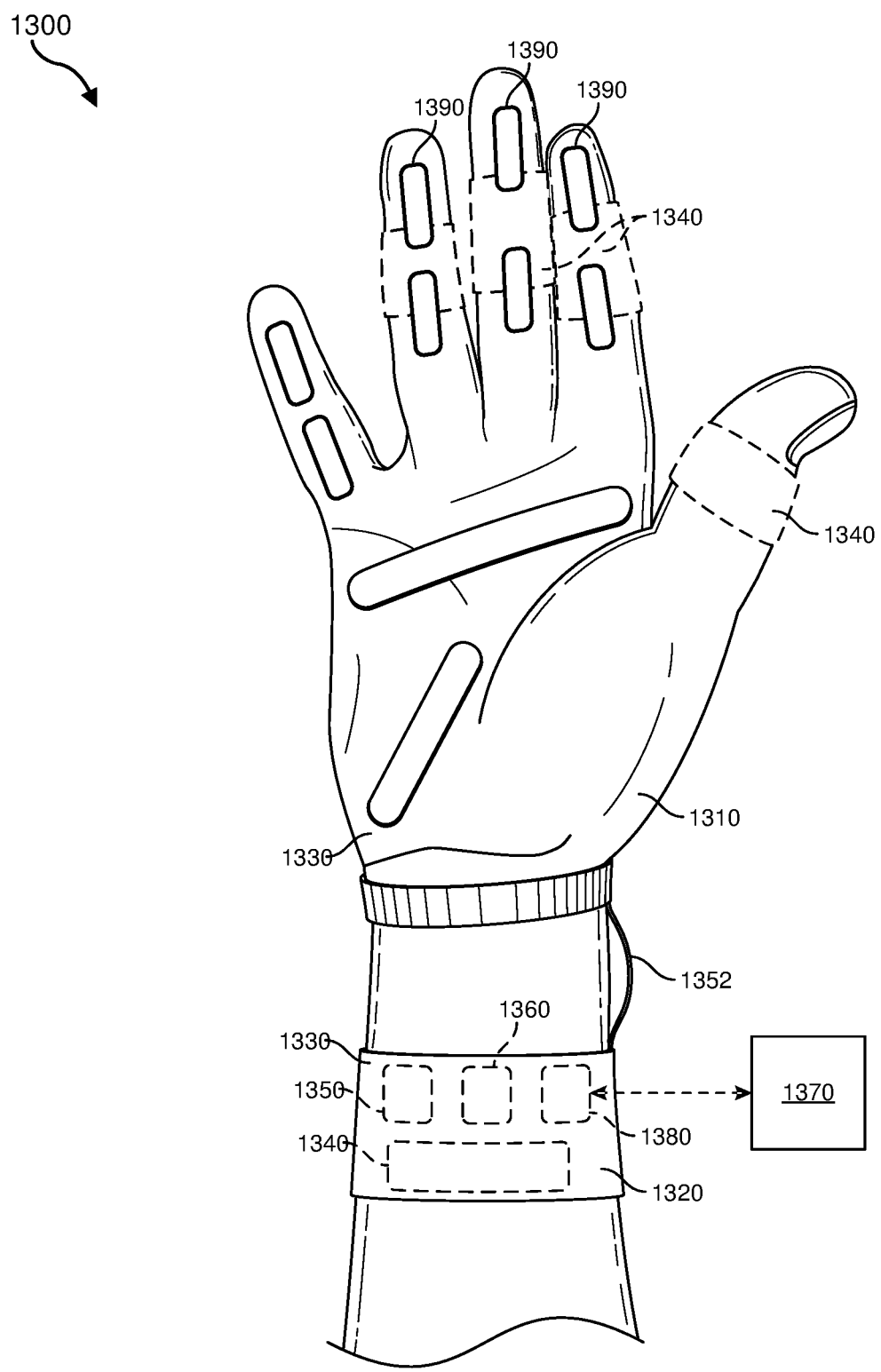
FIG. 13 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, a composite material, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned to be against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. A communications interface 1380 may enable communications between vibrotactile system 1300 and the other device or system 1370 via a wireless (e.g., Wi-Fi, Bluetooth, cellular, radio, etc.) link or a wired link. If present, communications interface 1380 may be in communication with processor 1360, such as to provide a signal to processor 1360 to activate or deactivate one or more of vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
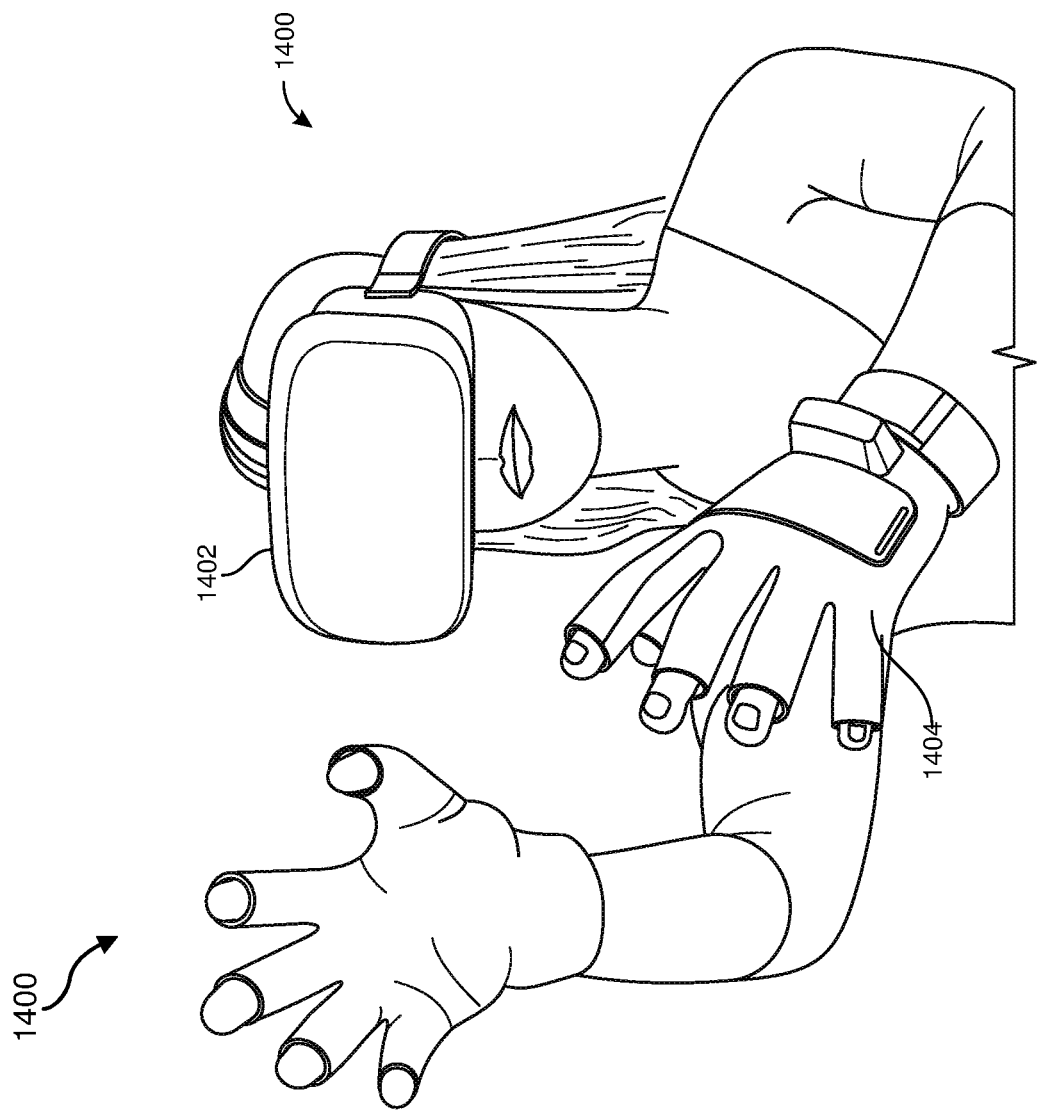
FIG. 14 is an illustration of an example virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1402 generally represents any type or form of virtual-reality system, such as virtual-reality system 1200 in FIG. 12. Haptic device 1404 generally represents any type or form of wearable device, worn by a use of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

Figure 15:
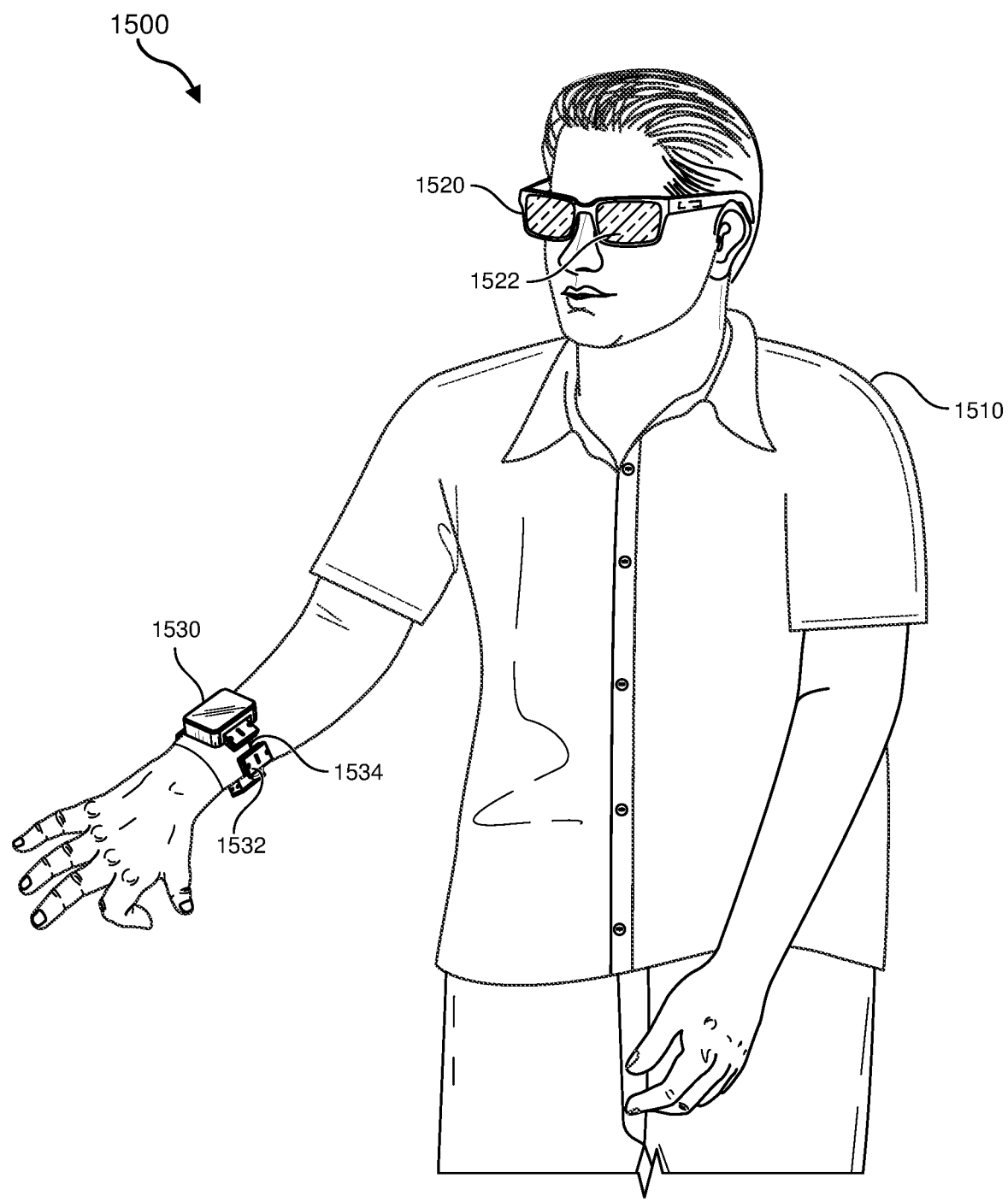
FIG. 15 is an illustration of an example augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view a user 1510 interacting with an augmented-reality system 1500. In this example, user 1510 may wear a pair of augmented-reality glasses 1520 that have one or more displays 1522 and that are paired with a haptic device 1530. Haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator, such as any of actuators 100, 200, 401, 501, or 601 described above) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A haptic vibrotactile actuator system, including: an inflatable bladder; and a flexible haptic vibrotactile actuator positioned on or in the inflatable bladder such that inflation and deflation of the inflatable bladder alters a vibrotactile sensation induced by the flexible haptic vibrotactile actuator in response to activation of the flexible haptic vibrotactile actuator.

Example 2: The haptic vibrotactile actuator system of Example 1, wherein the flexible haptic vibrotactile actuator is positioned within an interior of the inflatable bladder.

Example 3: The haptic vibrotactile actuator system of Example 1 or Example 2, wherein the flexible haptic vibrotactile actuator is positioned on an exterior of the inflatable bladder.

Example 4: The haptic vibrotactile actuator system of Examples 1 through 3, wherein the flexible haptic vibrotactile actuator is integrated into a membrane of the inflatable bladder.

Example 5: The haptic vibrotactile actuator system of any of Examples 1 through 4, wherein the flexible haptic vibrotactile actuator is secured to the inflatable bladder such that the flexible haptic vibrotactile actuator and the inflatable bladder are configured to flex together as a unit in response to an applied external force.

Example 6: The haptic vibrotactile actuator system of any of Examples 1 through 5, further comprising a pressurized fluid source that is fluidically coupled to the inflatable bladder for inflating the inflatable bladder with a pressurized fluid.

Example 7: The haptic vibrotactile actuator system of any of Examples 1 through 6, wherein the inflatable bladder is positioned in a wearable article to induce a pressure sensation to an intended user of the system in response to inflating upon receiving the pressurized fluid from the pressurized fluid source.

Example 8: The haptic vibrotactile actuator system of any of Examples 1 through 7, wherein the inflatable bladder is configured to increase the vibrotactile sensation in response to inflating upon receiving the pressurized fluid from the pressurized fluid source.

Example 9: The haptic vibrotactile actuator system of any of Examples 1 through 8, wherein the inflatable bladder is configured to alter a stiffness of the flexible haptic vibrotactile actuator upon inflation or deflation; and alter at least one characteristic of the vibrotactile sensation in response to inflating upon receiving the pressurized fluid from the pressurized fluid source.

Example 10: The haptic vibrotactile actuator system of any of Examples 1 through 9, wherein the pressurized fluid source comprises at least one of a fan; a piston; a valve; a pump; a pressurized chamber; a compressor; or a diaphragm.

Example 11: A wearable haptic system, including: a wearable article shaped and sized for donning by an intended user; at least one inflatable bladder supported by the wearable article; and a flexible haptic vibrotactile actuator positioned on a surface of the at least one inflatable bladder such that inflation and deflation of the at least one inflatable bladder alters an operating characteristic of the flexible haptic vibrotactile actuator.

Example 12: The wearable haptic system of Example 11, wherein the wearable article comprises at least one of: a glove; a headband; a sleeve; a bracelet; a watch band; a sock; a shoe; a jacket; a neck band; or a hat.

Example 13: The wearable haptic system of Example 11 or Example 12, wherein the at least one inflatable bladder comprises an array of inflatable bladders supported by the wearable article.

Example 14: The wearable haptic system of any of Examples 11 through 13, further comprising: a haptic controller; and a head-mounted display, wherein the haptic controller is communicatively coupled to the head-mounted display; configured to control a programmable bladder pressure within the at least one inflatable bladder in connection with content presented on the head-mounted display; and configured to apply an actuating voltage to the flexible haptic vibrotactile actuator in connection with content presented on the head-mounted display.

Example 15: The wearable haptic system of any of Examples 11 through 14, wherein the haptic controller controls the programmable bladder pressure to simulate an interaction between the intended user and a virtual object.

Example 16: The wearable haptic system of any of Examples 11 through 15, further comprising a pressurized fluid source that is fluidically coupled to the at least one inflatable bladder for inflating the at least one inflatable bladder with a pressurized fluid.

Example 17: The wearable haptic system of any of Examples 11 through 16, further comprising a haptic controller; and a pressure sensor coupled to the at least one inflatable bladder, wherein the haptic controller is configured to control a programmable bladder pressure; the pressure sensor is positioned and configured to sense a pressure of the pressurized fluid within the at least one inflatable bladder; and the at least one inflatable bladder is configured to induce a pressure sensation on the intended user based on the programmable bladder pressure.

Example 18: The wearable haptic system of any of Examples 11 through 17, wherein the at least one inflatable bladder is configured to alter the operating characteristic of the flexible haptic vibrotactile actuator upon inflation or deflation; and alter at least one characteristic of a vibrotactile sensation on the intended user in response to inflating upon receiving the pressurized fluid from the pressurized fluid source.

Example 19: The wearable haptic system of any of Examples 11 through 18, wherein the at least one inflatable bladder is configured to induce a pressure sensation on the intended user in response to inflating upon receiving the pressurized fluid from the pressurized fluid source; and increase a vibrotactile sensation on the intended user in response to inflating upon receiving the pressurized fluid from the pressurized fluid source.

Example 20: A method of operating a haptic vibrotactile actuator, the method including: inducing haptic vibration in a flexible haptic vibrotactile actuator positioned on or in an at least partially deflated inflatable bladder, wherein the inflatable bladder is supported by a wearable article and the haptic vibration is transmitted to an intended user donning the wearable article; inflating the inflatable bladder to apply a pressure against the intended user; and rendering a cumulative haptic stimulus to the intended user based on a simultaneous transmission of haptic vibration and applied pressure, wherein the cumulative haptic stimulus provides a greater intensity of haptic stimulus to the intended user as compared to an individual transmission of haptic vibration or an individual application of pressure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
   a wearable article configured to be worn on a body part of a user, the wearable article physically supporting:
      at least one inflatable bladder positioned in the wearable article and configured to induce a pressure sensation to the body part of the user upon inflation; and
      at least one haptic vibrotactile actuator positioned in the wearable article and configured to induce a haptic vibrotactile sensation to the body part of the user, wherein the at least one haptic vibrotactile actuator is also positioned adjacent to the at least one inflatable bladder such that inflation and deflation of the at least one inflatable bladder alters the haptic vibrotactile sensation induced by activation of the at least one haptic vibrotactile actuator.

2. The system of claim 1, wherein the at least one haptic vibrotactile actuator comprises at least one of the following materials:
   an electroactive polymer material;
   a dielectric elastomer material;
   a relaxor ferroelectric material;
   a piezoelectric ceramic material;
   a piezoelectric polycrystalline material; or
   a piezoelectric single-crystal material.

3. The system of claim 1, further comprising a controller operatively coupled to the at least one haptic vibrotactile actuator, wherein the controller is configured control at least one of a frequency or amplitude at which the at least one haptic vibrotactile actuator vibrates.

4. The system of claim 1, further comprising a pressurized fluid source that is fluidically coupled to the at least one inflatable bladder for inflating the at least one inflatable bladder with a pressurized fluid.

5. The system of claim 4, wherein the at least one inflatable bladder is configured to:
   alter a stiffness of the at least one haptic vibrotactile actuator upon inflation or deflation; and
   alter at least one characteristic of the haptic vibrotactile sensation in response to inflating upon receiving the pressurized fluid from the pressurized fluid source.

6. The system of claim 1, wherein the at least one haptic vibrotactile actuator is positioned on or in the at least one inflatable bladder.

7. The system of claim 1, wherein the at least one haptic vibrotactile actuator comprises an array of haptic vibrotactile actuators.

8. The system of claim 1, wherein the at least one inflatable bladder comprises an array of inflatable bladders.

9. The system of claim 1, wherein the at least one inflatable bladder is configured to be inflated or deflated independently from activation of the at least one haptic vibrotactile actuator.

10. The system of claim 1, wherein the at least one haptic vibrotactile actuator is positioned at least partially within the at least one inflatable bladder.

11. A system, comprising:
    a wearable article shaped and sized for wearing on a body part of a user;
    at least one inflatable bladder positioned on or in the wearable article in a location to apply a pressure sensation to the body part of the user upon inflation; and
    at least one haptic vibrotactile actuator positioned in the wearable article and configured to induce a haptic vibrotactile sensation on the body part of the user, wherein the at least one haptic vibrotactile actuator is also positioned adjacent to the at least one inflatable bladder such that inflation and deflation of the at least one inflatable bladder alters at least one operating characteristic of the at least one haptic vibrotactile actuator.

12. The system of claim 11, wherein the wearable article comprises at least one of:
- a glove;
- a headband;
- a sleeve;
- a bracelet;
- a watch band;
- a sock;
- a shoe;
- a jacket;
- a neck band; or
- a hat.

13. The system of claim 11, further comprising a head-mounted display configured to display content to the user, wherein:
inflation and deflation of the at least one inflatable bladder is synchronized with the content displayed to the user on the head-mounted display; and
activation of the haptic vibrotactile actuator is synchronized with the content displayed to the user on the head-mounted display.

14. The system of claim 13, wherein the head-mounted display comprises a communications unit for communicating control signals to the wearable article for inflation and deflation of the at least one inflatable bladder and for activation of the haptic vibrotactile actuator.

15. The system of claim 14, wherein the communications unit comprises a wireless communications unit configured to wirelessly communicate the control signals to the wearable article.

16. The system of claim 11, further comprising a pressure sensor coupled to the at least one inflatable bladder, wherein the pressure sensor is positioned and configured to sense a pressure of a fluid within the at least one inflatable bladder.

17. The system of claim 11, wherein the at least one operating characteristic of the at least one haptic vibrotactile actuator comprises the haptic vibrotactile sensation induced by the at least one haptic vibrotactile actuator on the body part of the user.

18. The system of claim 11, wherein the at least one inflatable bladder is configured to provide a variable-stiffness substrate for the haptic vibrotactile actuator.

19. The system of claim 11, wherein the at least one inflatable bladder is positioned on or in the wearable article in a location to induce a pressure sensation on the body part of the user in response to inflating.

20. A method, comprising:
coupling at least one haptic vibrotactile actuator to at least one inflatable bladder such that inflation and deflation of the at least one inflatable bladder alters at least one operating characteristic of the at least one haptic vibrotactile actuator; and
positioning the at least one inflatable bladder and the at least one haptic vibrotactile actuator on or in a wearable article that is shaped and sized for wearing on a body part of a user such that the at least one inflatable bladder is positioned to apply a pressure sensation to the body part of the user and the at least one haptic vibrotactile actuator is positioned to apply a haptic vibrotactile sensation to the body part of the user.

\* \* \* \* \*